(12) United States Patent
Dalmia

(10) Patent No.: US 11,599,487 B2
(45) Date of Patent: Mar. 7, 2023

(54) MULTI-ENDPOINT DATA TRANSPORT SYSTEM

(71) Applicant: Synaptics Incorporated, San Jose, CA (US)

(72) Inventor: Kamal Dalmia, Fremont, CA (US)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 17/156,150

(22) Filed: Jan. 22, 2021

(65) Prior Publication Data

US 2021/0232516 A1 Jul. 29, 2021

Related U.S. Application Data

(60) Provisional application No. 62/965,311, filed on Jan. 24, 2020.

(51) Int. Cl.
*G06F 13/20* (2006.01)
*H04L 5/14* (2006.01)
*G06F 13/42* (2006.01)

(52) U.S. Cl.
CPC .......... *G06F 13/20* (2013.01); *G06F 13/4282* (2013.01); *H04L 5/14* (2013.01); *G06F 2213/0016* (2013.01); *G06F 2213/0042* (2013.01)

(58) Field of Classification Search
CPC ............... G06F 13/20; G06F 13/4282; G06F 2213/0042; G06F 2213/0016; H04L 5/14
USPC .................... 710/6, 15, 33, 62; 370/280, 329
See application file for complete search history.

(56) References Cited

U.S. PATENT DOCUMENTS

| | | | |
|---|---|---|---|
| 5,781,028 A | 7/1998 | Decuir | |
| 10,347,571 B1* | 7/2019 | Rozbicki | ............. H01L 23/3121 |
| 2005/0152310 A1* | 7/2005 | Rudolf | ..................... H04L 5/003 |
| | | | 370/329 |
| 2006/0092967 A1* | 5/2006 | Bergeron | ............. H04L 12/2801 |
| | | | 370/463 |
| 2007/0266109 A1 | 11/2007 | Mellott et al. | |
| 2009/0132736 A1* | 5/2009 | Hasan | ................... G06F 13/4282 |
| | | | 710/56 |
| 2009/0210474 A1* | 8/2009 | Shao | .................... H04L 12/1877 |
| | | | 709/201 |
| 2009/0225779 A1 | 9/2009 | Diab et al. | |

(Continued)

FOREIGN PATENT DOCUMENTS

WO 2002/054748 A1 7/2002
WO 2014/053565 A2 4/2014

OTHER PUBLICATIONS

Dalmia, Asymmetrical Link Operation using IEEE, Aquantia Accelerating Connectivity, (2017) pp. 1-6.

(Continued)

*Primary Examiner* — Idriss N Alrobaye
*Assistant Examiner* — Henry W Yu
(74) *Attorney, Agent, or Firm* — Paradice & Li LLP

(57) ABSTRACT

A time domain duplex (TDD) device is disclosed. The TDD device may include at least a digital interface and a TDD physical interface (PHY). The digital interface may be coupled to a plurality of peripheral devices. The TDD PHY may be coupled to a micro-coaxial cable. The TDD device may aggregate data from the plurality of peripheral devices and transmit the aggregated data through the TDD PHY.

20 Claims, 8 Drawing Sheets

(56) References Cited

U.S. PATENT DOCUMENTS

| | | | |
|---|---|---|---|
| 2010/0046543 A1 | 2/2010 | Parnaby | |
| 2010/0115316 A1 | 5/2010 | Diab | |
| 2012/0020266 A1 | 1/2012 | Sun et al. | |
| 2012/0218922 A1* | 8/2012 | Klingenbrunn | H04W 76/10 370/280 |
| 2013/0114480 A1* | 5/2013 | Chapman | H04N 21/2221 370/282 |
| 2014/0362701 A1* | 12/2014 | Roh | H03M 13/2966 370/235 |
| 2015/0180693 A1* | 6/2015 | Trojer | H04J 4/00 370/294 |
| 2018/0317889 A1* | 11/2018 | Carpenter | G10K 11/346 |

OTHER PUBLICATIONS

Den Besten, Line Modulation Considerations for 2.5Gbps and 5/10Gbps Automotive Ethernet, 3ch1, NXP Semiconductors (2018) pp. 1-24, San Diego, CA.

International Search Report and Written Opinion dated Dec. 24, 2019, issued in International Appl. No PCT/US2019/050524, filed Sep. 11, 2019, 12 pages.

Pheanis, David C., et al., "Vehicle-Bus Interface with GMLAN for Data Collection", Proceedings of the ISCA 18th International Conference on Computers and Their Applications, Honolulu, HI, Mar. 28, 2003, pp. 88-92.

Souvignier et al, Asymmetrical Data Transmission, IEEE 802.3Ch Task Force, Broadcom (2018) pp. 1-14, San Diego, CA.

Substitute Specification filed Nov. 26, 2019 and Figures filed Jun. 20, 2019 from U.S. Appl. No. 16/447,714, filed Jun. 20, 2019.

* cited by examiner

MULTI-ENDPOINT DATA TRANSPORT SYSTEM

CROSS-REFERENCE TO RELATED APPLICATION

This application claims the benefit of commonly owned U.S. Provisional Patent Application No. 62/965,311 entitled "Multi-Endpoint Data Transport System" filed on Jan. 24, 2020, the entirety of which is hereby incorporated by reference.

TECHNICAL FIELD

This disclosure relates generally to data transport systems, and more specifically to multi-endpoint data transport systems.

BACKGROUND OF RELATED ART

Many computing devices such as smart phones, laptop computers, and the like, have an increasing number of high-speed peripheral devices that create and/or consume data. This data is often transported to and from an application processor through a variety of cables which are often terminated with connectors. The cables and the connectors may be expensive not only with respect to cost, but also in terms of space (e.g., area and volume) needed to support the cables and connectors. Further, as the number of peripheral devices increase, so does the number of cables and connectors.

BRIEF DESCRIPTION OF THE DRAWINGS

The present embodiments are illustrated by way of example and are not intended to be limited by the figures of the accompanying drawings.

SUMMARY

Figure 1:
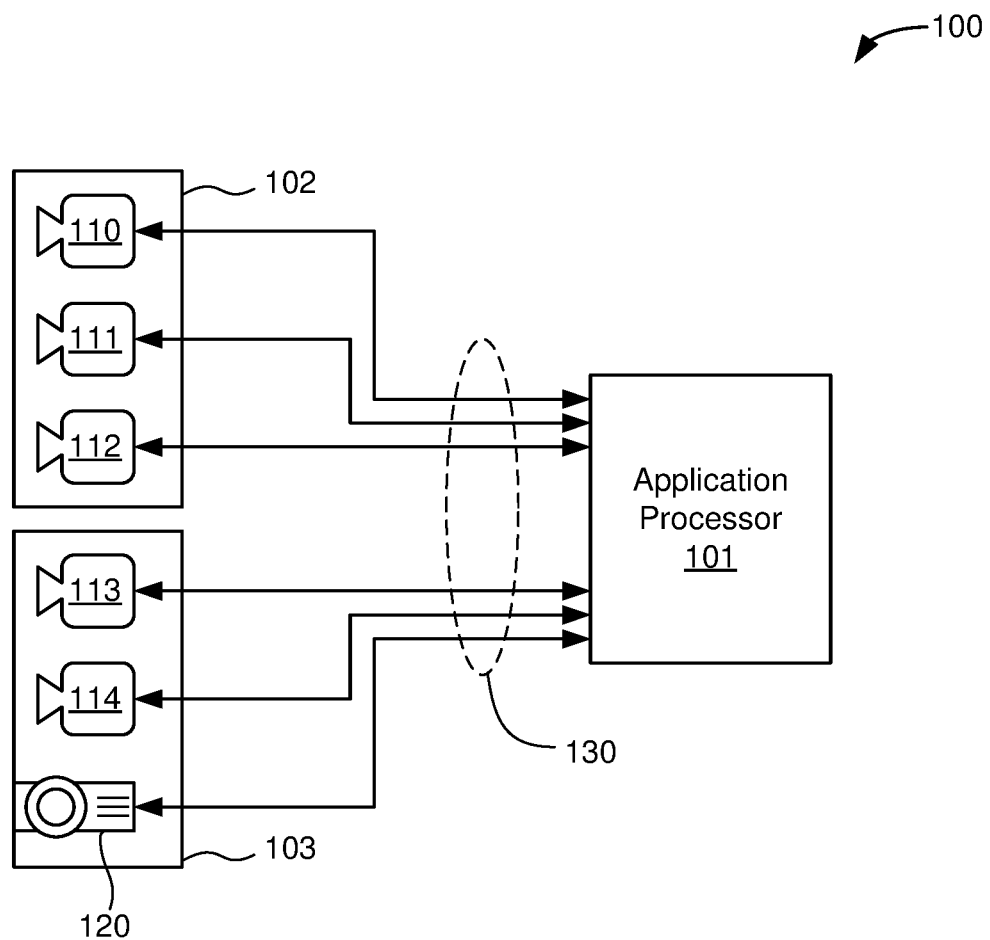
FIG. 1 shows a block diagram of a data transport system.

This Summary is provided to introduce in a simplified form a selection of concepts that are further described below in the Detailed Description. This Summary is not intended to identify key features or essential features of the claimed subject matter, nor is it intended to limit the scope of the claimed subject matter.

An integrated circuit is disclosed. The integrated circuit may include a first digital interface configured to transmit digital data to, and receive digital data from, a plurality of devices, a time domain duplex (TDD) physical interface (PHY) configured to transmit and receive data over a micro-coaxial cable, and a buffer coupled between the first digital interface and the TDD PHY. The buffer may be configured to aggregate the data received by the first digital interface and schedule the received data for transmission through the TDD PHY.

A data transport system is disclosed. The data transport system may include a processor and an integrated circuit. The integrated circuit may include a first digital interface configured to transmit digital data to and receive digital data from a plurality of devices, a time domain duplex (TDD) physical interface (PHY) configured to transmit data to and receive data from the processor over a micro-coaxial cable, and a buffer coupled between the first digital interface and the TDD PHY. The buffer may be configured to aggregate the data received by the first digital interface and schedule the received data for transmission through the TDD PHY.

DETAILED DESCRIPTION

In the following description, numerous specific details are set forth such as examples of specific components, circuits, and processes to provide a thorough understanding of the present disclosure. The term "coupled" as used herein means connected directly to or connected through one or more intervening components or circuits. The terms "electronic system" and "electronic device" may be used interchangeably to refer to any system capable of electronically processing information. Also, in the following description and for purposes of explanation, specific nomenclature is set forth to provide a thorough understanding of the aspects of the disclosure. However, it will be apparent to one skilled in the art that these specific details may not be required to practice the example implementations. In other instances, well-known circuits and devices are shown in block diagram form to avoid obscuring the present disclosure. Some portions of the detailed descriptions which follow are presented in terms of procedures, logic blocks, processing, and other symbolic representations of operations on data bits within a computer memory.

These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It should be borne in mind, however, that all of these and similar terms are to be associated with the appropriate physical quantities and are merely convenient labels applied to these quantities.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. Also, the example input devices may include components other than those shown, including well-known components such as a processor, memory, and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits, and instructions described in connection with the implementations disclosed herein may be executed by one or more processors. The term "processor," as used herein may refer to any general purpose processor, conventional processor, special purpose processor, controller, microcontroller, and/or state machine capable of executing scripts or instructions of one or more software programs stored in memory.

Various implementations relate generally to devices and systems used for data transport. Some implementations more specifically relate to a device and system to transport data to and from multiple peripheral devices. The system may include a time domain duplex (TDD) device. The TDD device may be configured to transmit and receive data from selected peripheral devices based on one or more applications being executed by a processor. The data may be transported through a TDD physical interface (PHY). The TDD PHY may transmit and receive data based on a flexible non-overlapping (NOL) schedule that supports varying data bandwidths. In some implementations, the TDD PHY may transmit the data over a micro-coaxial (coax) cable.

Particular implementations of the subject matter described in this disclosure can be implemented to realize one or more of the following potential advantages. In some implementations, the TDD PHY can receive, buffer, and sequence data, including image data, to and from a processor. Furthermore, in contrast with conventional cables and connectors, using a micro-coax cable to transmit data to and from the TDD PHY may reduce cabling and connector usage.

FIG. 1 shows a block diagram of a data transport system 100. The data transport system 100 may include an application processor 101, a first peripheral assembly 102, and a second peripheral assembly 103. The application processor 101 may be any processor, CPU, state machine, or the like capable of executing scripts or instructions of one or more software programs. The first peripheral assembly 102 may include a first camera 110, a second camera 111, and a third camera 112. The second peripheral assembly 103 may include a fourth camera 113, a fifth camera 114, and a dot projector 120. The devices included with the first peripheral assembly 102 and the second peripheral assembly 103 are merely illustrative and not limiting. In other implementations, the first peripheral assembly 102 and the second peripheral assembly 103 may include additional or fewer cameras, dot projectors, image sensors, or other feasible devices.

In some implementations, the data transport system 100 may be included within a smartphone. Thus, the first peripheral assembly 102 may be associated with back- or rear-facing cameras while the second peripheral assembly 103 may be associated with front- or forward-facing cameras. In other implementations, the data transport system 100 may be included within any feasible device, especially portable devices such as laptops, miniature action cameras, drones, or the like.

In some implementations, the data format used by the cameras 110-114 and the dot projector 120 may conform to a standard such as, but not limited to, the Mobile Industry Processor Interface (MIPI) Camera Serial Interface (CSI), the MIPI Display Serial Interface (DSI), an embedded Display Port (eDP) interface, a High-Definition Multimedia Interface (HDMI), or any other feasible interface. Thus, the cameras 110-114 and the dot projector 120 may be coupled to the application processor 101 through cables and connectors 130 that support any associated data format and interface. Each of the cables and connectors 130 may add cost and require space to implement.

Figure 2:
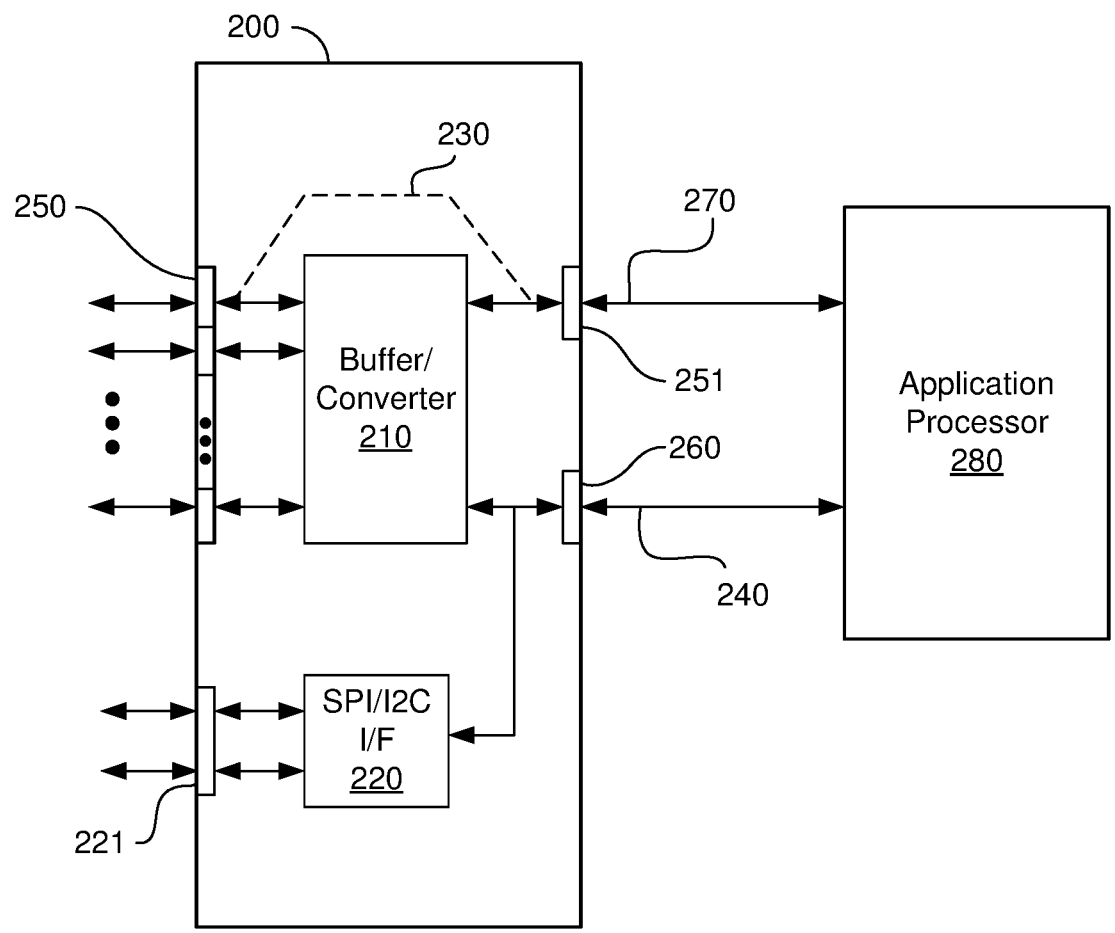
FIG. 2 shows a simplified block diagram of a context-aware time domain duplexing device, in accordance with some implementations.

FIG. 2 shows a simplified block diagram of a context-aware time domain duplexing (TDD) device 200, in accordance with some implementations. The context-aware TDD device 200 may include a buffer/converter 210, a serial peripheral interface (SPI)/inter-integrated circuit (I2C) interface 220, a serial port physical interface (PHY) 221, a video bypass path 230, digital interfaces 250, a digital interface 251, and a TDD PHY 260. In some embodiments, the context-aware TDD device 200 may be implemented as an integrated circuit. Therefore, the buffer/converter 210, the SPI/I2C interface 220, the serial port PHY 221, the video bypass path 230, the digital interfaces 250, the digital interface 251, and the TDD physical interface (PHY) 260 may be included within a single integrated circuit. In some implementations, the context-aware TDD device 200 may be coupled to an application processor 280 via a serial link 270 and the digital interface 251 and/or a TDD link 240 and the TDD PHY 260.

The context-aware TDD device 200 may enable data transport to and from multiple devices coupled to the digital interfaces 250. For example, the TDD device 200 may aggregate and/or combine data received via the digital interfaces 250 and transmit that data through the TDD PHY 260 and/or the digital interface 251. That is, the context-aware TDD device 200 may transfer data between the digital interfaces 250 and the TDD PHY 260, and/or between the digital interfaces 250 and the digital interface 251. In some implementations, the context-aware TDD device 200 may be coupled to several devices, such as cameras, projectors, or the like, and can combine the data from these devices for transmission through the TDD PHY 260 or the digital interface 251. In this manner, the cabling and connector usage associated with the cameras, projectors, and the like may be reduced, thereby reducing costs and area needed to transport the associated data, to the application processor 280. In some implementations, the application processor 280 may be one example of the application processor 101 of FIG. 1.

The digital interfaces 250 may include any feasible number of discrete digital interfaces and may be connected to cameras, projectors, or any other feasible peripheral device. For example, the digital interfaces 250 may be coupled to one or more peripheral assemblies (such as the first peripheral assembly 102 and/or the second peripheral assembly 103 of FIG. 1). In some implementations, the digital interfaces 250 and the digital interface 251 may conform to or support standards such as MIPI CSI, MIPI DSI, eDP, HDMI, or any other feasible interface or standard. In some implementations, the digital interface 251 may support the same interface standards as the digital interfaces 250. In some other implementations, the interfaces of the digital ports 250 and the digital port 251 may support different interface standards. In such implementations, the buffer/converter 210 may perform any signal, protocol, or other conversion procedure that may be needed to send and receive data in accordance with the different interface standards. The digital interface 251 may be coupled to a serial link 270. The serial link 270 may transport data in accordance with the interface standard of the digital interface 251.

The context-aware TDD device 200 may be configured to transport data to and from different peripheral devices by the application processor 280. For example, the application processor 280 may configure the buffer/converter 210 to process data from the different peripheral devices using different communication protocols. Since the application processor 280 is "aware" of the peripheral devices used during the execution of particular applications, the application processor 280 can configure the context-aware TDD device 200 to receive, process, and transmit data to and from the appropriate peripheral devices.

The TDD PHY 260 may provide a bidirectional interface for a high-speed communication link such as a TDD link 240. In some implementations, the TDD link 240 may be a bidirectional link that transports data between two devices based on a non-overlapping (NOL) schedule. NOL schedules and communication PHYs are described in more detail in patent application Ser. No. 16/447,714, entitled "Method and System for Bi-Directional Communication" filed Jun. 20, 2019, the entire contents of which are hereby incorporated herein by reference. For example, the TDD link 240 may be a bidirectional data link between the application processor 280 and one or more peripheral devices coupled to the context-aware TDD device 200. Each device coupled to the TDD link 240 may operate in an active mode or a silent mode, in an alternating fashion, according to the NOL schedule. More specifically, a device operating in the active mode may transmit data over the TDD link 240 and a device operating in the silent mode may receive data over the TDD link 240.

In some implementations, the NOL schedule may be flexible to support varying communication bandwidths between the two devices. For example, the NOL schedule may indicate a duration of time that a device uses the TDD link 240 to transmit data. When the NOL schedule allocates more time for the device to transmit data via the TDD link 240, the transmit communication bandwidth for the associated device increases. On the other hand, when the NOL schedule allocates less time for the device to transmit data via the TDD link 240, the transmit communication bandwidth for the associated device decreases. In some implementations, the NOL schedule may dynamically adapt to changes in bandwidth allocation for the devices.

In some implementations, the TDD link 240 may be implemented with a micro-coax cable which may be smaller, cheaper, and easier to use compared to discrete cables that are used in some cameras, projectors, and the like. The digital interfaces 250 may be coupled to the buffer/converter 210. The buffer/converter 210, in turn, may be coupled to the TDD PHY 260 and the digital interface 251. In some implementations, the bandwidths of the TTD PHY 260 and the TDD link 240 may be greater than the bandwidths (and in some cases the aggregate bandwidths) of the individual digital interfaces 250. Thus, the TDD PHY 260 and the TDD link 240 may be configured to transport data concurrently from multiple devices coupled to the digital interfaces 250.

In a first mode of operation, the buffer/converter 210 may be configured to process the data from the digital interfaces 250 for transport through the TDD link 240. Since the application processor 280 (coupled to the TDD device 200 through the TDD link 240) may be aware of the peripheral devices used during the execution of a particular application, the application processor 280 can configure the buffer/converter 210, through the TDD link 240, to process data from appropriate digital interfaces 250. In some implementations, the processing may include packing, compressing, encoding, packetizing, or any other feasible processing operations needed to transmit and/or receive data through the digital interfaces 250 and the TDD link 240.

In some implementations, the application processor 280 may determine which, if any, peripheral devices are needed for an application based on inputs, outputs, or other known parameters (collectively referred to as a "context") of the application. In other words, the application processor 280 may be aware of the context of the application. The application processor 280 may then configure the context-aware TDD device 200 accordingly. For example, if the application processor 280 is executing a camera application to take pictures with three rear-facing cameras, then the buffer/converter 210 may be configured to process image data from the three rear-facing cameras for transport through the TDD link 240. That is, since the application processor 280 may be aware that the camera application uses particular cameras, the application processor 280 can configure the buffer/converter 210 to process image data from those particular cameras.

In another example, some camera applications may require simultaneous operation of multiple cameras. The buffer/converter 210 may include a plurality of data buffers (not shown for simplicity) to provide temporary storage of image data from the plurality of cameras. Then, as the camera application is executed, data from multiple cameras may be stored in the plurality of buffers and then later transmitted through the TDD link 240. Thus, since the application processor 280 may be aware that a camera application uses a plurality of cameras whose image data needs to be buffered and sequenced, the application processor can configure the buffer/converter 210 to buffer and sequence the image data from the plurality cameras. Furthermore, since the application processor 280 may be aware of aggregate bandwidth requirements of the three rear-facing cameras used during a camera application, the application processor 280 may dynamically configure the TDD link 240 (through the NOL schedule) to accommodate the bandwidth requirements associated with the three rear-facing cameras.

In another example, if the application processor 280 is executing a face identification application, the buffer/converter 210 may be configured to provide dot data from the TDD link 240 to a dot projector. The dot projector may project a number of dots on a face to identify one or more facial features. That is, since the application processor 280 may be aware that the face identification application uses the dot projector, the application processor 280 can configure the buffer/converter 210 to provide data for the dot projector from the TDD link 240. Furthermore, during execution of the face identification application, one or more cameras may provide image data to the digital interfaces 250. The one or more cameras may capture the facial features based on the illumination from the dot projector. The buffer/converter 210 may be configured to process the image data for transport through the TDD link 240 to the application processor 280. Since the application processor 280 may be aware that the face identification application uses particular cameras to provide image data, the application processor 280 may configure the buffer/converter 210 to process and transport the image data from those particular cameras. Furthermore, since the application processor 280 may be aware of aggregate bandwidth requirements of the one or more cameras and the dot projector used during the face identification application, the application processor 280 may dynamically configure the TDD link 240 (through the NOL schedule) to accommodate the bandwidths associated with the one or more cameras and the dot projector.

In yet another example, if the application processor 280 is executing a video camera application, then the buffer/converter 210 may be configured to process video data from a particular camera received through the digital interfaces 250 for transport through the TDD link 240. That is, since the application processor 280 may be aware that the video camera application uses a particular camera to capture video data, the application processor 280 may configure the buffer/converter 210 to process and transport the video data from a selected camera through the TDD link 240. Furthermore, since the application processor 280 may be aware of bandwidth requirements of the camera providing video data used during the video camera application, the application processor 280 may dynamically configure the TDD link 240 (through the NOL schedule) to accommodate the bandwidth of the camera data.

In some implementations, a micro-coax cable may be coupled to the TDD PHY 260 and used to carry data between the peripheral devices and the application processor 280 on conventional devices. In addition, the application processor 280 may determine which peripheral devices are used (camera, projectors, etc.) with certain applications (camera applications, video applications, face identification applications, etc.). Accordingly, the application processor 280 may configure the context-aware TDD device 200 to transport data from any peripheral devices that can be used to support any given application. In some aspects, the application processor 280 may be aware of data formats, standards and/or protocols associated with different devices. For example, the application processor 280 may be aware that a particular device provides data in a first format and/or conforming to a first standard. Thus, the application processor 280 may configure the buffer/converter 210 to process and convert data from the first format and/or standard to a second format and/or standard based on operations or applications performed by the application processor 280.

In some implementations, the application process may provide configuration data for the context-aware TDD device 200 through the TDD link 240. That is, data to configure and/or control the TDD device 200 as well as data from cameras of other devices connected to the TDD device 200 may be carried through the TDD link 240. In some implementations, the application processor 280 also may provide control and configuration data for other devices through the SPI/I2C interface 220 and serial port PHY 221. For example, the serial port PHY 221 may be coupled to cameras, projectors, etc., and provide serial control and configuration data to the coupled devices received through the TDD link 240. In this manner, the application processor 280 may provide context-aware control of peripheral devices through the TDD link 240 and the SPI/I2C interface 220. Using the TDD link 240 to carry configuration and control data may further reduce cabling and connector costs.

In a second mode of operation, the buffer/converter 210 may also process data from the digital interfaces 250 for transport through the digital interface 251 and the serial link 270. Similar to the first mode of operation, the application processor 280 can configure the buffer/converter 210 through the TDD link 240 and/or the serial link 270 to transmit, receive, and/or process data from appropriate digital interfaces 250. In some implementations, the application processor 280 may configure the buffer/converter 210 through a separate control bus (not shown for simplicity). For example, if the application processor 280 is executing a camera application to take pictures with multiple cameras, then the buffer/converter 210 may be configured to process image data from the multiple cameras for transport through the digital interface 251 and the serial link 270. In some aspects, image data from the multiple cameras may be stored in buffers within the buffer/converter 210. The image data stored in the buffers may be transmitted through the digital interface 251 and the serial link 270. In another example, when executing a video camera application, the application processor 280 may configure the context-aware TDD device 200 to route video data received through one or more of the digital interfaces 250 to the serial link 270 through the video bypass path 230. The video bypass path 230 may provide a data path that avoids processing delays associated with the buffer/converter 210.

Thus, when operating in the second mode of operation, connector and cable usage may be advantageously reduced by replacing the multiple cables and connectors with a single cable and connector coupled to the digital interface 251. An example implementation is described in more detail below with respect to FIG. 3.

Figure 3:
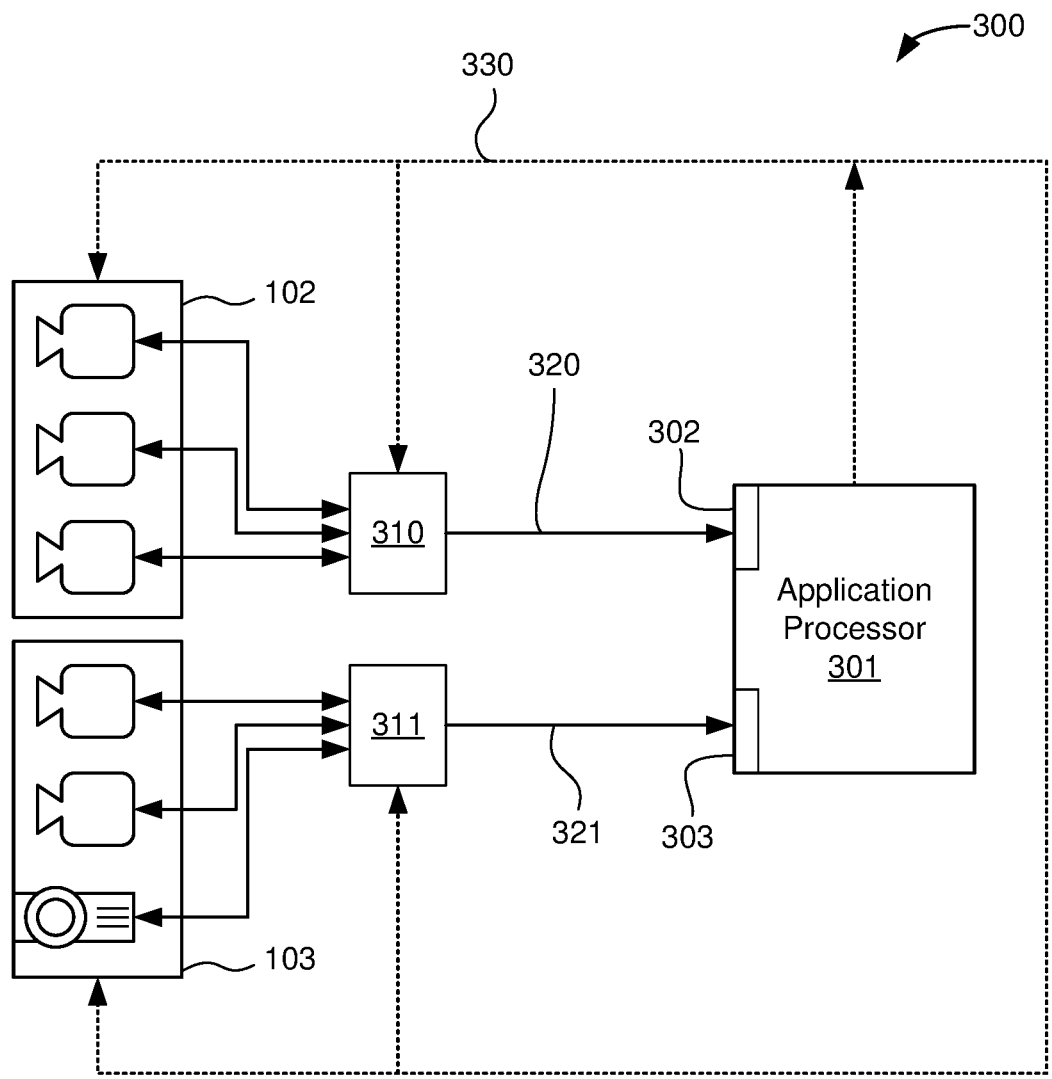
FIG. 3 shows a block diagram of a data transport system, in accordance with some implementations.

FIG. 3 shows a block diagram of a data transport system 300, in accordance with some implementations. The data transport system 300 may include an application processor 301, a first context-aware TDD device 310, a second context-aware TDD device 311, the first peripheral assembly 102 of FIG. 1, and the second peripheral assembly 103 of FIG. 1. In some implementations, each of the first context-aware TDD device 310 and the second context-aware TDD device 311 may be one example of the context-aware TDD device 200 of FIG. 2. In some implementations, the data transport system 300 may be included within a smartphone, portable devices such as laptops, miniature action cameras, drones, automotive applications, video surveillance cameras, or any other technically feasible system, subsystem, device, or the like.

The application processor 301 may be one example of the application processor 101 and/or the application processor 280 and may include a first digital interface 302 and a second digital interface 303. In some implementations, each of the first and second context-aware TDD devices 310 and 311 also may include a digital interface (not shown for simplicity) that is substantially similar, if not identical, to the digital interfaces 302 and 303, respectively, of the application processor 301. For example, the first digital interface 302, the second digital interface 303 and the digital interfaces of the first and second context-aware TDD devices 310 and 311 may conform to and support MIPI CSI, MIPI DSI, eDP, HDMI, or any other feasible standard or interface.

The first context-aware TDD device 310 may be coupled to the first peripheral assembly 102. The first peripheral assembly 102 may be connected to the first context-aware TDD device 310 through a digital interface that is similar, if not identical, to a corresponding digital interface on the first context-aware TDD device 310 (not shown for simplicity). In some implementations, the first context-aware TDD device 310 may be included within the first peripheral assembly 102. Thus, in some implementations, the first context-aware TDD device 310 may enable a single cable/connect assembly 320 to be used to couple to multiple devices (e.g., devices associated with the first peripheral assembly 102) to the application processor 301.

In a similar manner, the second context-aware TDD device 311 may be coupled to the second peripheral assembly 103 and coupled to the second digital interface 303 through a cable/connector assembly 321. Therefore, the second context-aware TDD device 311 may enable a single cable/connect assembly 321 to be used to couple multiple devices (e.g., devices associated with the second peripheral assembly 103) to the application processor 301.

In some implementations, cables and connectors associated with a standard interface (such as MIPI CSI, MIPI DSI, eDP, HDMI, and the like) may be used to connect the first context-aware TDD device 310, the application processor 301, the second context-aware TDD device 311, and the application processor 301. In some aspects, a single cable may couple the application processor 301 to multiple devices on the first peripheral assembly 102. Similarly, a single cable may couple the application processor 301 to multiple devices on the second peripheral assembly 103.

Although the data transport system 300 shows two context-aware TDD devices 310 and 311, in other implementations, a single context-aware TDD device may be used. For example, both the first peripheral assembly 102 and the second peripheral assembly 103 may be coupled to a single context-aware TDD device having sufficient digital interfaces.

In some implementations, the application processor 301 may control the first and second context-aware TDD devices 310 and 311, the first peripheral assembly 102, and the second peripheral assembly 103 through a separate control bus. For example, a control bus 330 may provide configuration and control information to the first and second context-aware TDD devices 310 and 311, the first peripheral assembly 102, and the second peripheral assembly 103. The control bus 330 may be a SPI bus, an I2C bus, or any other feasible bus. In some implementations, more than one control bus may be used to provide the functionality of the control bus 330. In some implementations, a micro-coax may be used to simplify cabling within a data transport system. One example implementation is described in more detail below with respect to FIG. 4.

Figure 4:
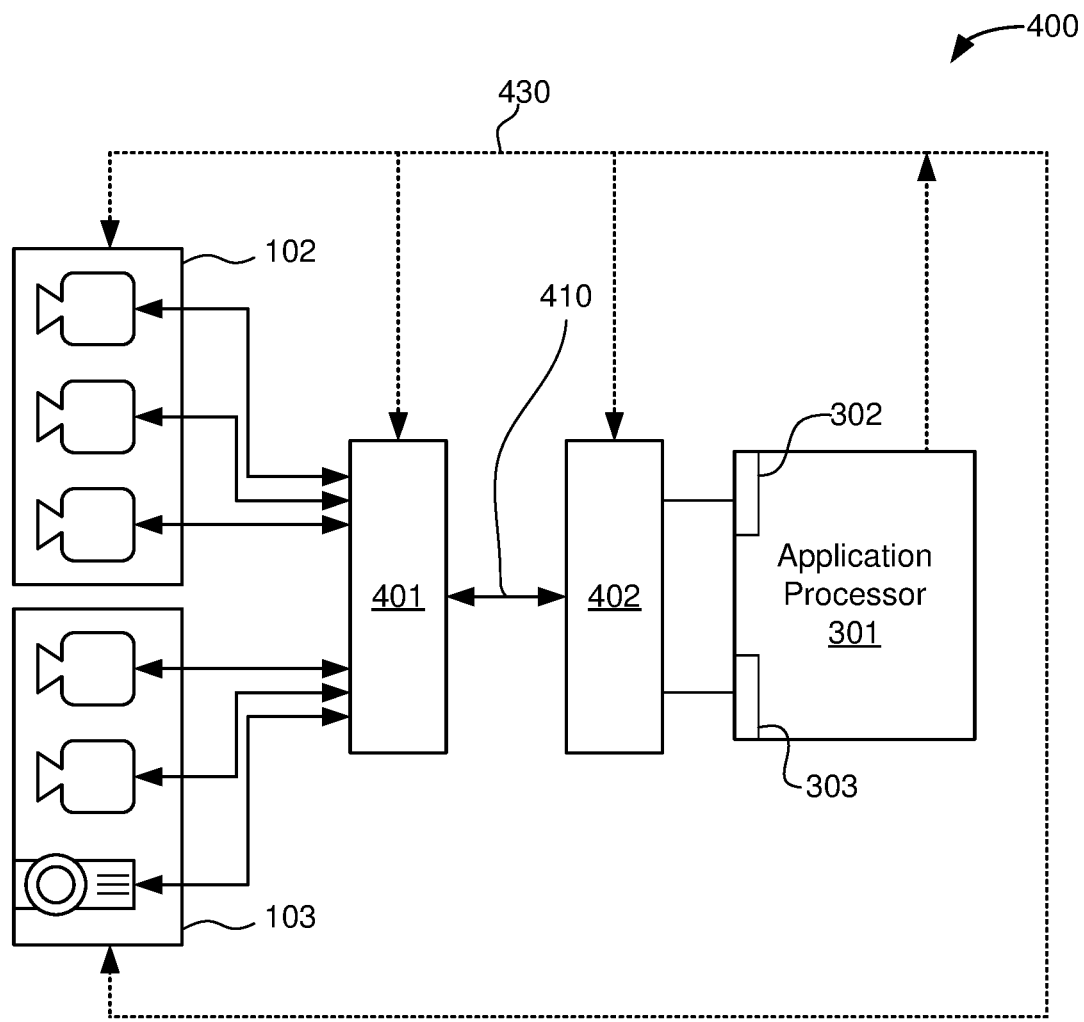
FIG. 4 shows a block diagram of another data transport system, in accordance with some implementations.

FIG. 4 shows a block diagram of another data transport system 400, in accordance with some implementations. The data transport system 400 may include the application processor 301 of FIG. 3, a first context-aware TDD device 401, a second context-aware TDD device 402, the first peripheral assembly 102 of FIG. 1, and the second peripheral assembly 103 of FIG. 1. In some implementations, the first context-aware TDD device 401 and the second context-aware TDD device 402 may be one example of the context-aware TDD device 200 of FIG. 2. The data transport system 400 may include multiple TDD devices to enable the transport of data from a plurality of peripheral devices through a micro-coax cable.

The first peripheral assembly 102 and the second peripheral assembly 103 may be coupled to the first context-aware TDD device 401. Connections between the first peripheral assembly 102 and the first context-aware TDD device 401 may be through digital interfaces that support various type of interfaces, including standard interfaces such as MIPI CSI, MIPI DSI, eDP, HDMI, or the like.

The second context-aware TDD device 402 may be coupled to the application processor 301. In some implementations, the second context-aware TDD device 402 may include one or more digital interfaces (not shown for simplicity) similar, if not identical, to the first digital interface 302 and/or the second digital interface 303 of the application processor 301. Thus, the second context-aware TDD device 402 may be coupled to the application processor 301 through the first digital interface 302 and/or the second digital interface 303.

The first context-aware TDD device 401 may be coupled to the second context-aware TDD device 402 through a TDD link 410. In some implementations, the TDD link 410 may be implemented with a micro-coax cable which may be smaller and easier to route than conventional cables. Thus, in some implementations, the first context aware TDD device 401 and the second context aware TDD device 402 may enable a single TDD link to couple a plurality of devices (e.g., devices associated with the first peripheral assembly 102 and the second peripheral assembly 103) to the application processor 301.

In some implementations, the application processor 301 may control the first and second context-aware TDD devices 401 and 402, the first peripheral assembly 102, and the second peripheral assembly 103 through a separate control bus. For example, a control bus 430 may provide configuration and control information to the first and second context-aware TDD devices 401 and 402, the first peripheral assembly 102, and the second peripheral assembly 103. The control bus 430 may be a SPI bus, an I2C bus, or any other feasible bus. In some implementations, more than one control bus may be used to provide the functionality of the control bus 430.

Figure 5:
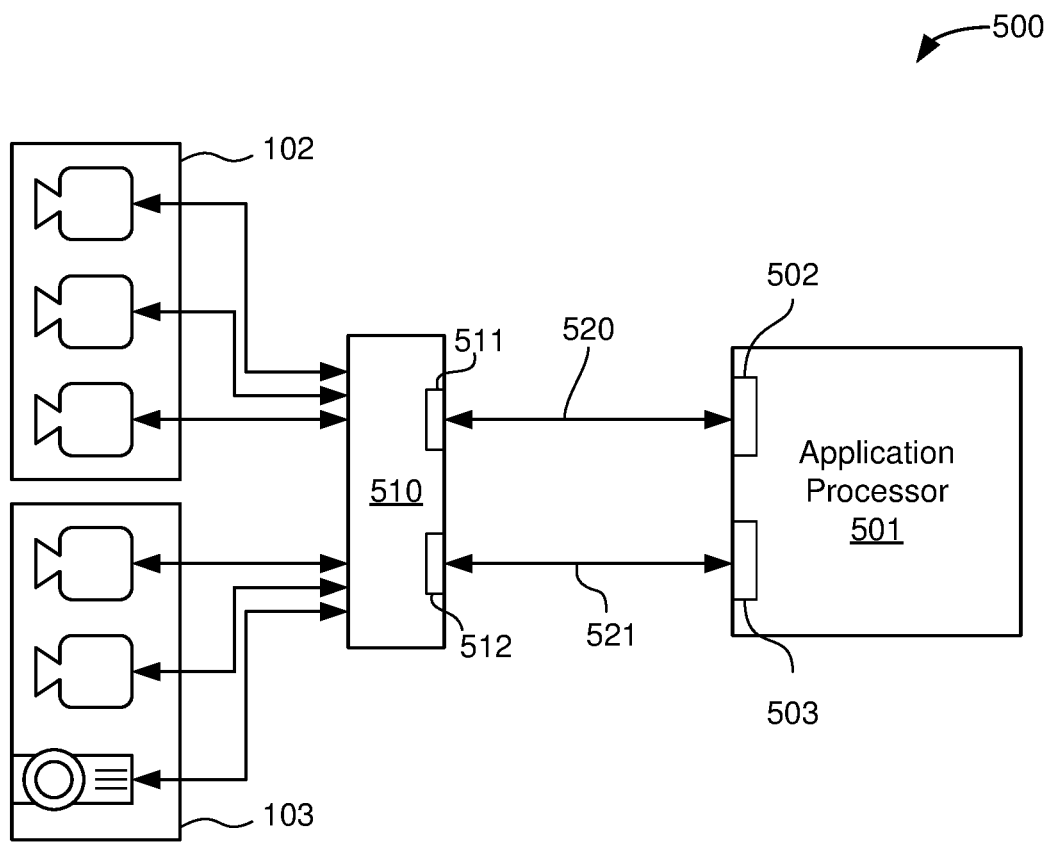
FIG. 5 shows a block diagram of still another data transport system, in accordance with some implementations.

FIG. 5 shows a block diagram of another data transport system 500, in accordance with some implementations. The data transport system 500 may include an application processor 501, a context-aware TDD device 510, and the first and second peripheral assemblies 102 and 103 of FIG. 1. The application processor 501 may be one example of the application processor 101 of FIG. 1 and/or the application processor 280 of FIG. 2, and also may include TDD PHYS 502 and 503. The TDD PHYS 502 and 503 may be implementations of the TDD PHY 260 of FIG. 2.

The context-aware TDD device 510, which may be one example of the context-aware TDD device 200 of FIG. 2, may include TDD PHYS 511 and 512 and multiple digital interfaces (not shown for simplicity) to connect to the devices in the first peripheral assembly 102 and the second peripheral assembly 103. A first TDD link 520 may couple the TDD PHY 511 to the TDD PHY 502 and a second TDD link 521 may couple the TDD PHY 512 to the TDD PHY 503.

In some implementations, data between the first peripheral assembly 102 and the application processor 501, and between the second peripheral assembly 103 and the application processor 501 may be carried through the first and second TDD links 520 and 521, respectively. The first and second TDD links 520 and 521 may be implemented with micro-coax cables that are smaller and easier to route compared to conventional cables.

In some implementations, the application processor 501 may control the context-aware TDD device 510, the first peripheral assembly 102, and the second peripheral assembly 103 through either or both of the first and second TDD links 520 and 521. Since the first and second TDD links 520 and 521 may be bidirectional (as described above with respect to FIG. 2), configuration and control data from the application processor 501 may be transported through either or both of the first and second TDD links 520 and 521. In other implementations, configuration and control data may be carried through a separate control bus (not shown for simplicity). The TDD PHYS 502 and 503 may enable the data transport system 500 to use fewer components and maintain functionality with respect to other data transport systems.

Figure 6:
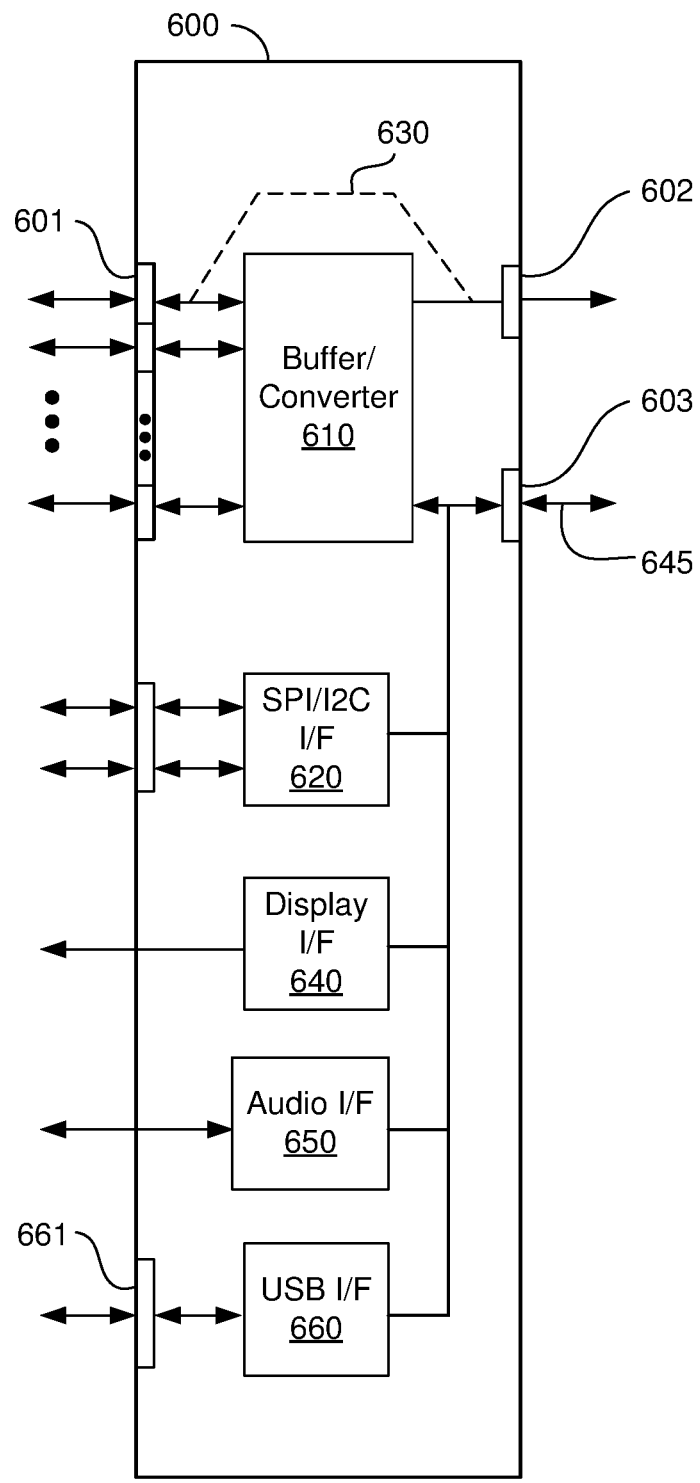
FIG. 6 shows a simplified block diagram of another implementation of a context-aware TDD device.

FIG. 6 shows a simplified block diagram of another implementation of a context-aware TDD device 600, in accordance with some implementations. The context-aware TDD device 600, may include a buffer/converter 610, a SPI/I2C interface 620, digital interfaces 601, a digital interface 602, a TDD PHY 603, a video bypass path 630, a display interface 640, an audio interface 650, a universal serial bus (USB) interface 660 and a USB PHY 661. In other implementations, the context-aware TDD device 600 may include fewer components, more components, and/or different components than those described herein. The context-aware TDD device 600 may enable data transport between multiple devices coupled to the digital interfaces 601 and a TDD link 645 and/or the digital interface 602. For example, the context-aware TDD device 600 may be coupled to several devices, such as cameras, projectors, or the like, and can combine data from these devices for transmission through the TDD PHY 603 and/or the digital interface 602.

The buffer/converter 610 may be an implementation of the buffer/converter 210 of FIG. 2. The buffer/converter 610 may be coupled to the digital interfaces 601. The buffer/converter 610 may also be coupled to the digital interface 602 and the TDD PHY 603. The digital interface 602 and the TDD PHY 603 may be coupled to similar ports associated with an application processor (not shown for simplicity). The video bypass path 630 may be an implementation of the video bypass path 230. The SPI/I2C interface 620 may be an implementation of the SPI/I2C interface 220.

The display interface 640 may receive display data from the TDD PHY 603 and may process and/or format the data for use with a display (not shown for simplicity). The audio interface 650 may transmit and/or receive audio data through the TDD PHY 603 and may be connected to one or more microphones, one or more speakers, and/or a microphone/headphone jack (not shown for simplicity). The USB interface 660 may be coupled between the USB PHY 661 and the TDD PHY 603. The USB interface 660 may enable the USB PHY 661 to transmit and/or receive USB data.

Thus, the context-aware TDD device 600 may be used to carry more than image and/or video data to and from one or more cameras. As shown, display data, audio data, and USB data may also be transported to and from an application processor, or similar device, through the TDD PHY 603 and an associated TDD link 645. Thus, in some aspects, cables associated with display data, audio data and USB data may be eliminated, reducing costs, and easing implementation.

Figure 7:
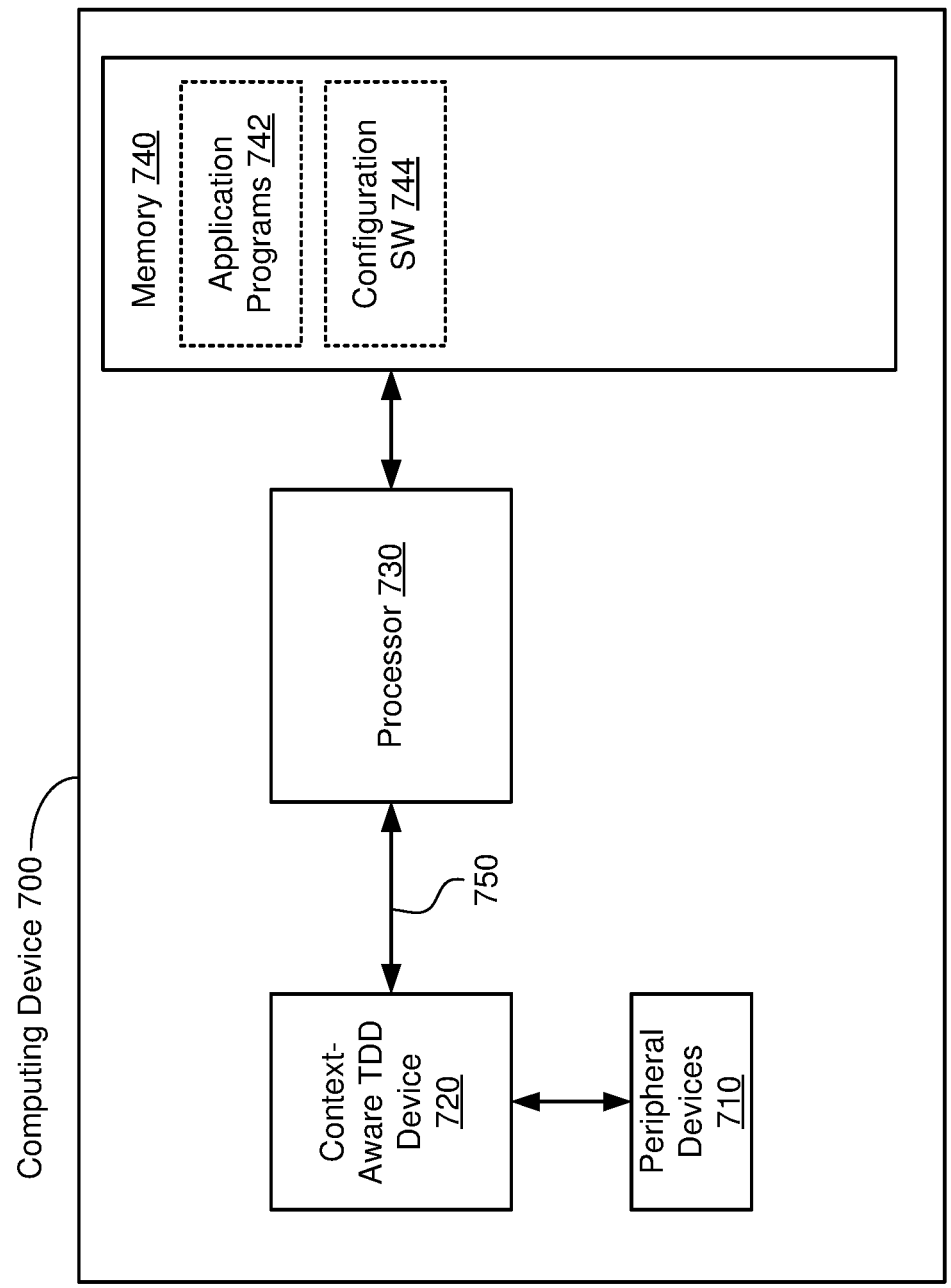
FIG. 7 shows a block diagram of a computing device, in accordance with some implementations.

FIG. 7 shows a block diagram of a computing device 700, in accordance with some implementations. The computing device 700 may include peripheral devices 710, a context-aware TDD device 720, a processor 730, and a memory 740. The peripheral devices 710 may include cameras, projectors, data (audio and/or video) interfaces, and the like. In some implementations, the peripheral devices 710 may include the first peripheral assembly 102 and/or the second peripheral assembly 103 of FIG. 1. The context-aware TDD device 720 may be coupled to the peripheral devices 710 and may be an implementation of the context-aware TDD device 200 of FIG. 2, the context-aware TDD devices 310 and 311 of FIG. 3, the context-aware TDD devices 401 and 402 of FIG. 4, the context-aware TDD device 510 of FIG. 5, or the context-aware TDD device 600 of FIG. 6. The context-aware TDD device 720 may be coupled to the processor 730 through a link 750. In some implementations, the link 750 may be a TDD link such as the TDD link 240, a serial link, such as the serial link 270, or any other feasible data link.

The processor 730, which is also coupled to the memory 740, may be any one or more suitable processors capable of executing scripts or instructions of one or more software programs stored in the computing device 700 (such as within memory 740). In some implementations, the processor 730 may be one example of the application processor 101, the application processor 301, and/or the application processor 501.

The memory 740 may include a non-transitory computer-readable storage medium (e.g., one or more nonvolatile memory elements, such as EPROM, EEPROM, Flash memory, a hard drive, etc.) that may store the following software modules:
  application programs 742 to perform one or more operations associated with the peripheral devices 710; and
  configuration software (SW) to configure the context-aware TDD device 720.

Each software module includes program instructions that, when executed by the processor 730, may cause the computing device 700 to perform the corresponding function(s). Thus, the non-transitory computer-readable storage medium of memory 740 may include instructions for performing all or a portion of the operations of FIG. 8.

Processor 730 may execute the application programs 742 to perform operations with one or more peripheral devices. Example application programs may include a picture taking application using one or more rear-facing cameras, another picture taking application using one or more forward-facing cameras, a face identification application to unlock the computing device 700, a USB application transmitting or receiving USB data to and from a USB device, or any other feasible application. In some implementations, the processor 730 may select one or more applications included in the application programs 742 to execute.

The processor 730 may execute the configuration SW module 744 to configure the context-aware TDD device 720. In some implementations, execution of the configuration SW module 744 may cause the processor 730 to determine which applications have been selected for execution. Based on the one or more selected application programs, the processor 730 may determine which peripheral devices included in the peripheral devices 710 to control, and also configure the context-aware TDD device 720 to receive and transmit data related to the peripheral devices 710 through the link 750.

Figure 8:
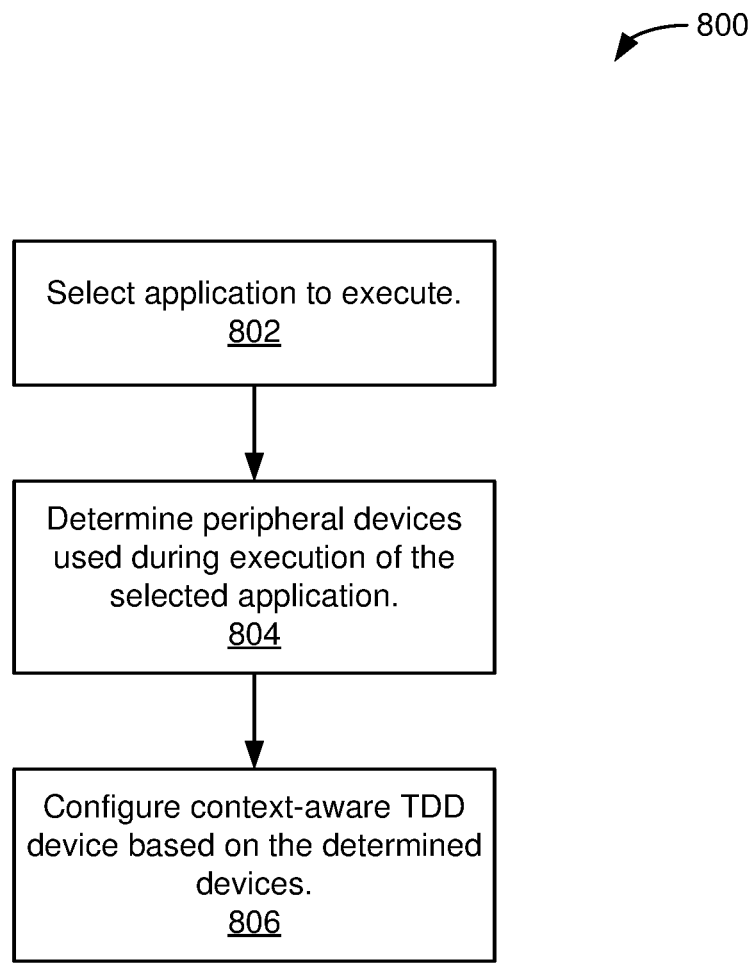
FIG. 8 shows an illustrative flow chart depicting an example operation for operating a context-aware TDD device, in accordance with some implementations.

FIG. 8 shows an illustrative flow chart depicting an example operation 800 for operating a context-aware TDD device, in accordance with some implementations. By way of example, the operation 800 may be performed by the processor 730 of FIG. 7. In other implementations, the operation 800 may be performed by any feasible processor (including a general-purpose processor), a state machine, or any other technically feasible device, circuit, or module. In some implementations, the operation 800 may include fewer or more operational blocks than those depicted in the example of FIG. 8. Further, two or more of the operational blocks may be performed in a different order and/or in parallel.

The operation begins in block 802 as the processor 730 selects an application to execute. For example, the processor 730 may select a camera application, a face identification application, a video conferencing application, or any other feasible application to execute.

Next, in block 804, the processor 730 determines which peripheral devices are used during the execution of the selected application. For example, if the selected application is a camera related application, then the processor 730 determines which cameras are used during execution of the camera related application. In other example, if the selected application is a projector related application, then the processor 730 determines which projectors are used during execution of the projector related application.

Next, in block 806, the processor 730 configures the context-aware TDD device 720 based at least in part on peripheral devices used during the execution of the selected application. For example, if the selected application is a camera related application, then the processor 730 configures the context-aware TDD device 720 to receive image data from cameras associated with the related application. In addition, the processor 730 may configure the context-aware TDD device 720 to transport the image data through the link 750. In some implementations, the processor 730 may configure the context-aware TDD device 720 to store data, including image data, in buffers prior to sequencing and transporting the image data through the link 750. In another example, if the selected application is a projector related application, then the processor 730 configures the context-aware TDD device 720 to provide projector data to a projector associated with the related application.

In some implementations, the processor 730 may configure operations of the link 750 based on the selected application. For example, the processor 730 may determine or modify a NOL schedule for the link 750 based on bandwidth requirements associated with devices used during execution of the selected application.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

In the foregoing specification, embodiments have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. An integrated circuit, comprising:
    a first digital interface disposed on the integrated circuit and configured to transmit digital data to, and receive digital data from, a plurality of devices;
    a time domain duplex (TDD) physical interface (PHY) disposed on the integrated circuit and configured to transmit and receive data over a micro-coaxial cable; and
    a buffer coupled between the first digital interface and the TDD PHY and configured to:
        aggregate the digital data received by the first digital interface; and
        process the aggregated digital data for transmission by the TDD PHY, over the micro-coaxial cable, based on an application context associated with at least one of the plurality of devices.

2. The integrated circuit of claim 1, wherein the aggregated digital data is transmitted by the TDD PHY according to a non-overlapping schedule between the integrated circuit and a receiving device.

3. The integrated circuit of claim 1, wherein the integrated circuit is controlled, at least in part, by commands received through the TDD PHY.

4. The integrated circuit of claim 1, further comprising:
    a serial port PHY coupled to the TDD PHY and configured to transmit and receive data in accordance with a serial protocol.

5. The integrated circuit of claim 4, wherein the serial protocol conforms to at least one selected from the group of a serial peripheral interface (SPI) protocol and an inter-integrated circuit (I2C) protocol.

6. The integrated circuit of claim 1, further comprising:
    a second digital interface; and
    a bypass data path coupled between the second digital interface and the first digital interface and configured to transport video data directly between the first digital interface and the second digital interface.

7. The integrated circuit of claim 6, wherein the first and second digital interfaces include at least one interface selected from the group of a Mobile Industry Processor Interface (MIPI) camera serial interface (CSI), a MIPI display serial interface (DSI), an embedded display port (eDP), and a high-definition multimedia interface (HDMI).

8. The integrated circuit of claim 1, wherein a bandwidth of the TDD PHY meets or exceeds a bandwidth associated with the first digital interface.

9. The integrated circuit of claim 1, further comprising:
    a universal serial bus (USB) PHY coupled to the TDD PHY and configured to transmit and receive USB data.

10. The integrated circuit of claim 1, further comprising:
    a display interface configured to receive display data from the TDD PHY and provide the display data to a display through a third device interface.

11. A data transport system, comprising:
    a processor; and
    an integrated circuit comprising:

a first digital interface disposed on the integrated circuit and configured to transmit digital data to and receive digital data from a plurality of devices;
a time domain duplex (TDD) physical interface (PHY) disposed on the integrated circuit and configured to transmit data to and receive data from the processor over a micro-coaxial cable; and
a buffer coupled between the first digital interface and the TDD PHY and configured to:
aggregate the digital data received by the first digital interface; and
process the aggregated digital data for transmission by the TDD PHY, over the micro-coaxial cable, based on an application context associated with at least one of the plurality of devices.

12. The data transport system of claim 11, wherein the aggregated digital data is transmitted by the TDD PHY according to a non-overlapping schedule between the integrated circuit and the processor.

13. The data transport system of claim 11, wherein the integrated circuit is controlled, at least in part, by commands received through the TDD PHY.

14. The data transport system of claim 11, wherein the integrated circuit further comprises:
a serial port PHY coupled to the TDD PHY and configured to transmit and receive data in accordance with a serial protocol.

15. The data transport system of claim 14, wherein the serial protocol conforms to at least one selected from the group of a serial peripheral interface (SPI) protocol and an inter-integrated circuit (I2C) protocol.

16. The data transport system of claim 11, wherein the integrated circuit further comprises:
a second digital interface; and
a bypass data path coupled between the second digital interface and the first digital interface and configured to transport video data directly between the first digital interface and the second digital interface.

17. The data transport system of claim 16, wherein the first and second digital interfaces of the integrated circuit include at least one selected from the group of a Mobile Industry Processor Interface (MIPI) camera serial interface (CSI), a MIPI display serial interface (DSI), an embedded display port (eDP), and a high-definition multimedia interface (HDMI).

18. The data transport system of claim 11, wherein a bandwidth of the TDD PHY meets or exceeds a bandwidth associated with the first digital interface.

19. The data transport system of claim 11, wherein the integrated circuit further comprises:
a universal serial bus (USB) PHY coupled to the TDD PHY and configured to transmit and receive USB data.

20. The data transport system of claim 11, wherein the integrated circuit further comprises:
a display interface configured to receive display data from the TDD PHY and provide the display data to a display through a third device interface.

* * * * *